June 18, 1929. M. FISCHER 1,717,965
METHOD AND MEANS FOR CONTROLLING THE VALVE MOTION IN PISTON ENGINES
Filed March 21, 1924   3 Sheets-Sheet 2
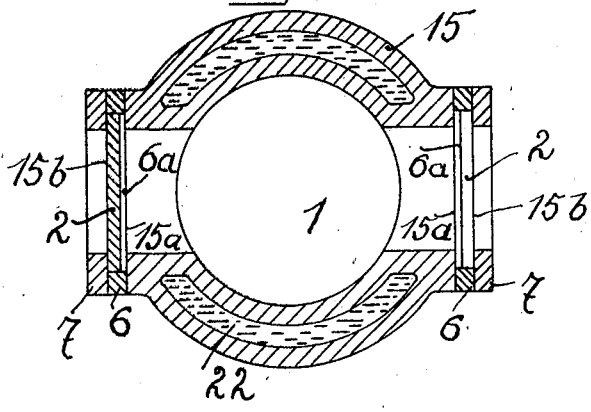
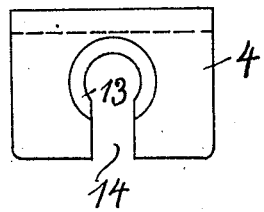
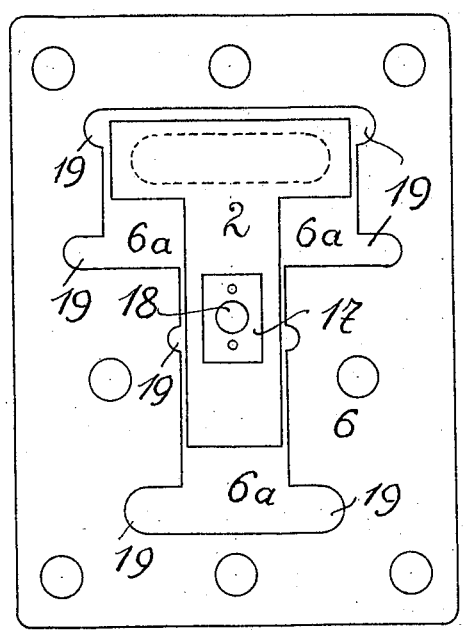
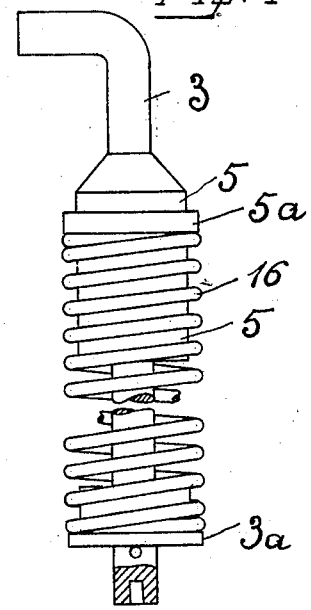
Inventor:
Martin Fischer

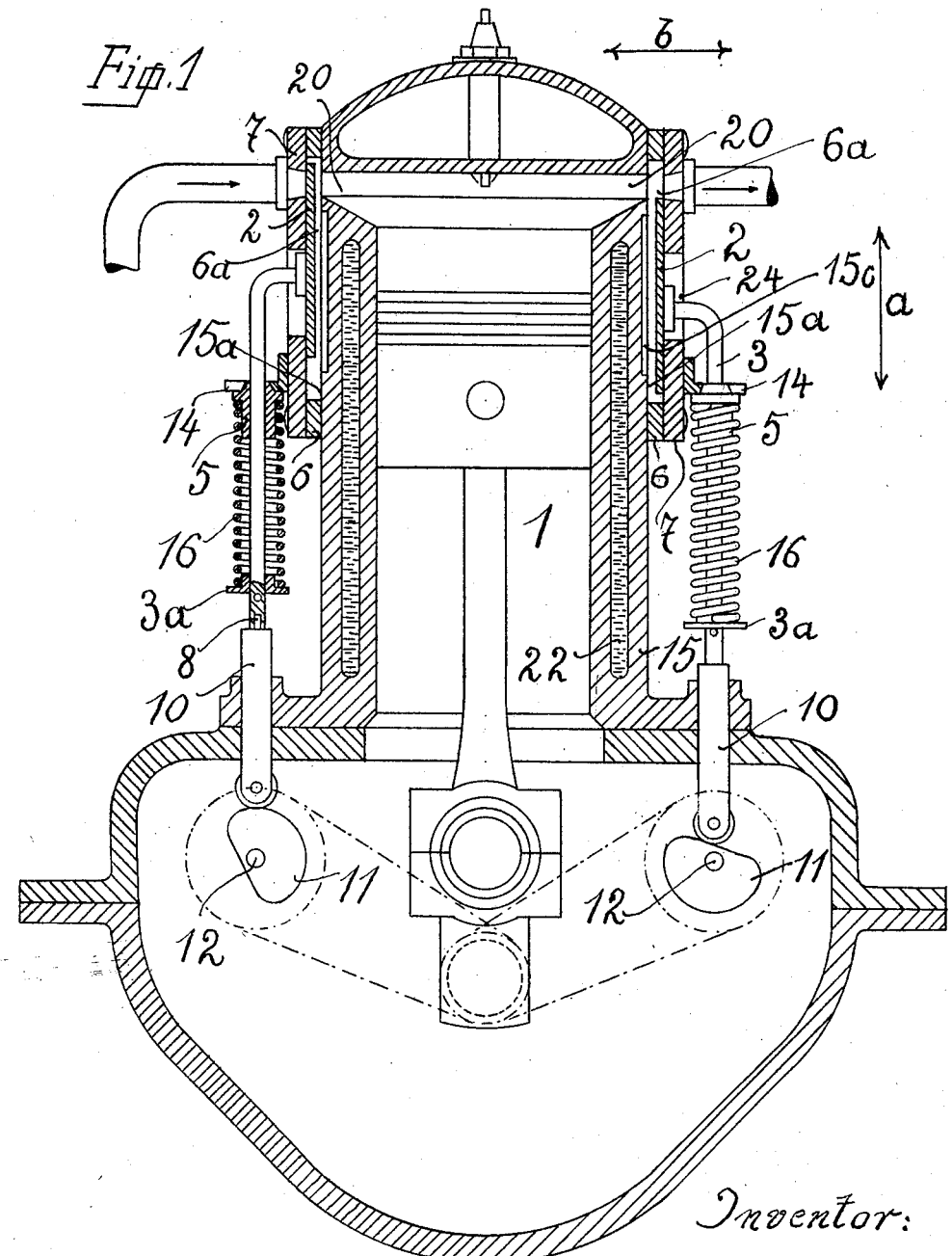

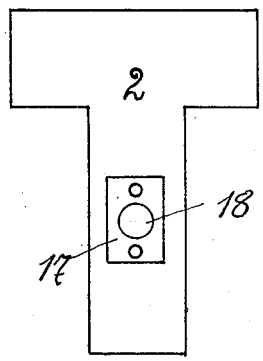
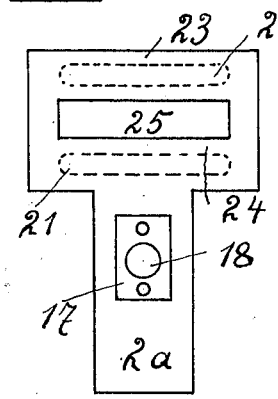
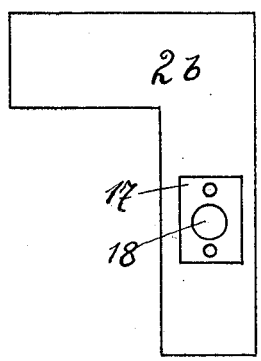
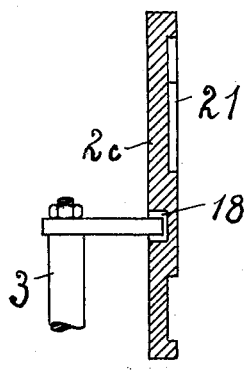
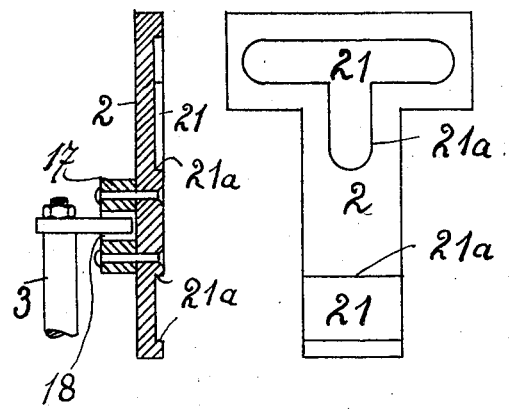

Patented June 18, 1929.

1,717,965

UNITED STATES PATENT OFFICE.

MARTIN FISCHER, OF ZURICH, SWITZERLAND.

METHOD AND MEANS FOR CONTROLLING THE VALVE MOTION IN PISTON ENGINES.

Application filed March 21, 1924, Serial No. 700,860, and in Switzerland March 31, 1923.

It has been previously proposed, in such as motors, compressors, pumps and so forth, and more particularly in internal combustion engines, to employ flat or convex slide-valves. These slide-valves, however, are operated positively, that is, they receive their movement only by a distributing or regulating rod or the like, the preventing of the leakage of the slide-valves against the inlet and outlet openings being effected by means of springs, packings or other stuffing devices. This type of controlling gear has drawbacks and especially the disadvantage that it necessitates considerable friction and consequently a lot of lubrication which, however, reduces the gas-tightness of the slide-valve casings.

According to the method of the present invention and in contradistinction to the above, each slide-valve, owing to the differences of pressure taking place in the engine cylinder, receives a second movement in a direction which is lateral to the aforementioned checked movement. By this second movement, representing a free lateral swinging of the slide-valve, a tight contact of the two sliding faces of the slide-valve is alternately realized, without any auxiliary mechanical means.

The method described may be carried out by the aid of a device wherein each of the slide-valves is mounted between two guiding surfaces and in a chamber which is closed on all sides, each valve remaining substantially parallel to the guiding surfaces and being adapted to move laterally of the direction of its gear-controlled movement.

The accompanying drawing illustrates, by way of example, one form of construction in which the improved method may be carried out.

In these drawings:—

Fig. 1 shows an axial section of a motor;

Fig. 2 a cross section through the motor cylinder, and

Figs. 3 to 11 represent details and modifications,

Fig. 3 being a bottom plan of the guide bar which, as seen in Fig. 1, is slotted at 14;

Fig. 4, an enlarged view of a portion of the valve gear shown in Fig. 1.

Fig. 5 an L-shaped modification of the valve shown in Fig. 1.

Fig. 6 shows the formation in detail of the plate 6 of Fig. 1, with the valve disposed therein.

Fig. 7 is a view of the T-shaped slide valve in its relation to supporting member 17.

Fig. 8 is a central longitudinal section of the valve of Fig. 7.

Fig. 9 is a view of the inner face of the valve of Fig. 7.

Fig. 10 discloses a modified form of valve, the slot 21 being duplicated.

Fig. 11 represents a modification of Fig. 8.

The cylinder 1 of the motor is fitted with a water jacket 22 and a water chamber 15, Figs. 1 and 2, and the said water jacket formed at opposite sides with an inlet and outlet opening 20 respectively, and with machined guiding surfaces $15^a$. Attached to each of these guiding surfaces and adapted to receive a slide-valve 2 is a frame-like plate 6, Fig. 6, provided with an opening $6^a$ of a shape and size corresponding with the surface covered during the action of the slide-valve. The plate 6 is somewhat thicker than the slide-valve 2 and covered on the outer side by a cover plate 7 which, by means of screw-bolts extending through the plate 6 and screwing into the engine cylinder, is tightly screwed against the same, in such a manner, that a chamber is formed which is closed all round and within which the slide-valve may not only execute its gear-controlled up and down movement in the direction of the arrow $a$, Fig. 1, but also freely move to and fro in the direction of the arrow $b$. The slide-valve 2 is of T-shape, Figs. 6, 7, 9 and 10, in order that, when of thin construction, it does not get warped, thereby to the detriment of its gas-tightness.

In the modified design as shown in Fig. 5, the slide-valve $2^b$ is for the same purpose formed with an upper lateral extension to produce the gas-tightness of the inlet and outlet openings. This L-shape being a variation of the T-shape slide valve.

The slide-valve 2 is moreover provided with a recess 21 at the side facing the cylinder, the edges or walls $21^a$ of this recess being at right angles to the sliding faces of the valve, Figs. 8 and 9. The purpose of these recesses 21 is to permit of the scraping off the dirt from the guiding surfaces and retain it until the motor is cleaned, the dirt thus being prevented from unduly prejudicing the movement of the slide-valves in the direction of the arrow $b$. The plate 6 is for a like purpose formed with recesses 19. The inner face $15^b$ of the cover, Figs. 1 and 2, and the face $15^a$ of the cylinder, which alternately serve as guiding faces for the slide-valve 2, are also provided with recesses 15ᶜ for the reception therein of unclean substances. The outer face of each of the slide-valves 2 has attached thereto a shoulder piece or support 17 possessing a bore 18 with which the upper and bent art of the distributing rod 3 is made loosely to engage as a means for the gear-controlled movement *a* of the slide-valve.

According to the modification, Fig. 11, the rod 3 is caused loosely to engage a bore in the slide-valve 2ᶜ.

In consequence of the loose connection of the slide-valve with the distributing rod the former may adjust itself in such a way that the distance between the centre plane of the slide-valve and the axis of the rod 3 may vary, a room for play being formed either between the inner face of the slide-valve 2 and the guiding face 15ᵃ, Fig. 2, in which case the outer face of the slide-valve abuts against the inner face 15ᵇ of the then guiding surface of the cover 7; or, a space for play being made between the outer face of the slide-valve 2 and the upper part of the distributing rod 3, in which latter case the inner face of the slide-valve is tightly abutting against the guiding surface 15ᵃ. In the first case an opening 24 (Fig. 1) in the cover 7 for the rod, and an opening in the cover 7 corresponding with the inlet or outlet openings 20 of the cylinder are closed up gastight, while in the second case the inlet, or the outlet opening 20 respectively of the cylinder is shut off. This free reciprocating movement of the slide-valve in two opposite directions, which might be called a rhythmical "respiration" of the slide-valve, is not produced mechanically, but by the differences of the pressures in the cylinder. When the pressure in the cylinder is above atmospheric the position shown in Fig. 1 is produced, and when the pressure is below atmospheric the slide-valves are made to abut against the guiding surfaces 15ᵃ. The controlling gear, that is, the cams 11 mounted on the driven shafts 12 are preferably so disposed that the regulating movements are taking place at the moment when the difference in the pressure is at a minimum, so that apart from the small construction of the slide-valves, exceedingly small power for their movement in the direction *b* is required.

The distributing rod 3 is at its lower end in loose engagement with a pin 8 of another rod 10 forming part of the remaining controlling gear and is loosely mounted in and guided by a sleeve 5 which at its upper end is of the shape of a cone having a shoulder 5ᵃ, Figs. 1 and 4. This cone is fitting into the correspondingly cone-shaped recess 13 of an angle iron 4 secured to the cylinder. By the action of a spring 16, of which one end presses against the aforesaid shoulder 5ᵃ of the sleeve 5 while the other end rests upon a disc or washer 3ᵃ fastened on the rod 3, the sleeve 5 is tightly pressed from below into its bearing 13, 13. The latter has a lateral slot 14 corresponding in width with the diameter of the rod 3. It is thus possible by means of a suitable instrument to detach the rod 3 from the pin 8 and, since it only loosely engages at the top with the bore 18, to withdraw the rod laterally together with the sleeve 5 and the spring, so that subsequent to the removal of the covers 7 the slide-valves 2 can easily be dismounted. For the lateral removal of the rods 3 there are thus no screws or the like to be detached, such as is necessary in constructions hitherto known.

The construction hereinbefore described possesses at each side of the cylinder only one inlet or one outlet opening. Tests have proved, however, that the provision of two inlets at one side and one above the other, and two similarly situated outlets at the other side are an advantageous arrangement. To that end the slide-valve is built in the form of a double slide 2ᵃ and possesses, as indicated in Fig. 10, a slot 25, whereby two controlling bars 23 and 24 are formed, the same slide-valve thus simultaneously regulating the two superposed inlet or outlet openings.

Practical trials extending over many years with an automobile engine provided with freely and rhythmically "respirating" slide-valves according to my invention have given the result, that these slide-valves efficiently work without any lubrication and with hardly any friction, the wear therefore being limited to practically a minimum. The guiding and sliding surfaces had thereby become highly polished. Leakage is prevented thereof without springs and auxiliary mechanical means, while the action of the motor, owing to the libration of the slide-valves, is exceedingly smooth. Moreover, the small and light design of the slide-valves makes this swinging or balancing construction possible.

What I claim as new and desire to secure by Letters Patent is:—

1. In piston engine sliding valves, each slide valve being mounted in an enclosed space, a recess in the slide, a cross-piece for each slide, a control rod for each slide engaged loosely in said recess of the slide, so that the distance between the central plane of the slide and the axis of the control rod may vary during the operation without interrupting the positive drive of the slide.

2. In piston engine sliding valves, each slide valve being mounted in an enclosed space, at least one surface of the guiding surface of the cylinder and of the face of the cylinder adjacent the slide being provided with a recess for receiving solid impurities.

3. In piston engine sliding valves, each slide valve being mounted in an enclosed space, a frame-like plate between the guiding surface of the cylinder and the cover plate, said plate having lateral slots for receiving foreign matter.

4. In piston engine sliding valves, each slide valve being mounted between two guiding surfaces forming an enclosed space, valve controlling mechanism, a distributing rod loosely connected at one end with the controlling mechanism, and loosely connected at the other end with the slide valve, a slotted member secured to the cylinder, said distributing rod extending through the slot in said member, so that the distributing rod may be readily removed.

MARTIN FISCHER.